(12) United States Patent
Pistilli et al.

(10) Patent No.: US 11,110,828 B2
(45) Date of Patent: Sep. 7, 2021

(54) VEHICLE SEAT ASSEMBLY AND RETURN SPRING MECHANISM

(71) Applicant: LEAR CORPORATION, Southfield, MI (US)

(72) Inventors: Gregory Pistilli, Freising (DE); Florian Gerbl, Berglern (DE); Alexej Niederhaus, Velden (DE); Mathias Busch, Freising (DE); Tino Schneider, Isen (DE); Rajdeep Rajput, Freising (DE); Michael Schuhbauer, Schweitenkirchen (DE); Arunkumar Boda, Ingolstadt (DE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/932,321

(22) Filed: Jul. 17, 2020

(65) Prior Publication Data
US 2021/0061141 A1    Mar. 4, 2021

(30) Foreign Application Priority Data

Aug. 30, 2019   (DE) ..................... 10 2019 213 143.3

(51) Int. Cl.
*B60N 2/22*     (2006.01)
*B60N 2/30*     (2006.01)
*B60N 2/68*     (2006.01)

(52) U.S. Cl.
CPC ............. *B60N 2/22* (2013.01); *B60N 2/3013* (2013.01); *B60N 2/68* (2013.01)

(58) Field of Classification Search
CPC ........ B60N 2/20; B60N 2/206; B60N 2/3013; B60N 2/3009
See application file for complete search history.

(56) References Cited

U.S. PATENT DOCUMENTS

| 3,156,501 | A | * | 11/1964 | Harris | ...................... | A47C 7/58 |
| | | | | | | 297/333 |
| 5,803,546 | A | * | 9/1998 | Yamazaki | ................ | A47C 7/60 |
| | | | | | | 297/331 |
| 6,631,954 | B2 | * | 10/2003 | Amorin | .................... | B60N 2/20 |
| | | | | | | 267/154 |
| 8,360,529 | B2 | | 1/2013 | Armbruster | | |

(Continued)

FOREIGN PATENT DOCUMENTS

| CN | 1733524 | A | * | 2/2006 | ............... | B60N 2/22 |
| CN | 203358392 | U | * | 12/2013 | ............. | B60N 2/366 |

(Continued)

*Primary Examiner* — Timothy J Brindley
(74) *Attorney, Agent, or Firm* — Brooks Kushman P.C.

(57) ABSTRACT

A vehicle seat assembly, a biasing mechanism, and a method of installing a vehicle seat assembly are provided. A first end region of a torsion spring is for fixed connection to a vehicle frame bracket mount such that the seat back rotates relative to the first end region of the spring about a transverse axis. A second end region of the torsion spring is offset from the transverse axis. A support bracket is connected to the seat back, with the intermediate region of the torsion spring supported for rotation by the support bracket. A block supported by the support bracket and offset from the transverse axis, with the block contacting the second end region of the torsion spring to bias the spring when the seat back is in a first, use position.

20 Claims, 4 Drawing Sheets

(56) References Cited

U.S. PATENT DOCUMENTS

| | | | | |
|---|---|---|---|---|
| 8,899,679 | B2* | 12/2014 | Edwards | B60N 2/366 |
| | | | | 297/292 |
| 8,944,506 | B2* | 2/2015 | Zeimis, III | B60N 2/682 |
| | | | | 297/333 |
| 9,308,840 | B2 | 4/2016 | Stesl et al. | |
| 2014/0265505 | A1* | 9/2014 | Li | B60N 2/20 |
| | | | | 297/354.13 |
| 2018/0015850 | A1* | 1/2018 | Bruck | B60N 2/0232 |
| 2018/0022240 | A1* | 1/2018 | Dry | B60N 2/3011 |
| | | | | 297/354.12 |
| 2018/0079333 | A1* | 3/2018 | Ma | B60N 2/3065 |
| 2018/0326882 | A1* | 11/2018 | Bach | B60N 2/824 |
| 2021/0129727 | A1* | 5/2021 | Pistilli | B60N 2/20 |

FOREIGN PATENT DOCUMENTS

| | | | | |
|---|---|---|---|---|
| DE | 102006051270 B3 * | 5/2008 | | B60N 2/36 |
| DE | 202008014250 U1 * | 2/2009 | | B60N 2/36 |
| DE | 102009058707 A1 * | 6/2011 | | B60N 2/3013 |
| JP | 2003327028 A * | 11/2003 | | B60N 2/3013 |
| KR | 20120107136 A * | 9/2012 | | B60N 2/3009 |
| WO | WO-2015078599 A1 * | 6/2015 | | B60N 2/015 |

\* cited by examiner

VEHICLE SEAT ASSEMBLY AND RETURN SPRING MECHANISM

CROSS-REFERENCE TO RELATED APPLICATION

This application claims foreign priority benefits under 35 U.S.C. § 119(a)-(d) to DE 10 2019 213 143.3, Filed Aug. 30, 2019, the disclosure of which is hereby incorporated by reference in its entirety.

TECHNICAL FIELD

Various embodiments relate to a vehicle seat assembly with an upper seat back release mechanism and return spring mechanism.

BACKGROUND

A vehicle seat assembly may be provided with a spring mechanism to bias the vehicle seat back towards the forward folded position when the seat back is released. Examples of vehicle seat assemblies may be found in U.S. Pat. Nos. 9,308,840, 8,360,529, 8,899,679, and 6,631,954.

SUMMARY

In an embodiment, a vehicle seat assembly is provided with a seat back having a seat back bracket for connection to a fixed bracket mount. The seat back bracket and fixed bracket mount cooperate to support the seat back for rotational movement about a transverse axis from a first, use position to a second, folded position relative to a seat base. The vehicle seat assembly has a torsion spring with a first end region, a second opposed end region, and an intermediate region positioned therebetween. The first end region is adjacent to the seat back bracket and is for fixed connection to the bracket mount such that the seat back rotates relative to the first end region of the spring about the transverse axis. The second end region is offset from the transverse axis. A support bracket is connected to the seat back, with the intermediate region of the torsion spring supported for rotation by the support bracket. A block is supported by the support bracket and offset from the transverse axis, with the block contacting the second end region of the torsion spring to bias the spring when the seat back is in the first position.

According to a further embodiment, the block is spaced apart from the second end region of the torsion spring with the torsion spring unloaded when the seat back is in the second position.

According to another further embodiment, the seat back has a third position between the first and second positions. The block is in contact with the second end region of the torsion spring to bias the spring while the seat back moves between the first and third positions. The block is spaced apart from the second end region of the torsion spring such that the spring is unloaded while the seat back moves between the third and second positions.

According to an even further embodiment, a distance between the block and the second end region of the torsion spring increases as the seat back moves from the third position to the second position.

According to another even further embodiment, the seat back is substantially vertical in the third position.

According to a further embodiment, the block is a first block. The vehicle seat assembly has a series of blocks, with one of the series of blocks being the first block. Each block in the series of blocks has a different thickness to provide a range of loadings of the torsion spring with the seat back in the first position.

According to another further embodiment, the torsion spring has a curved section between the intermediate region and the second end region such that the intermediate region and the second end region are substantially parallel to one another.

According to a further embodiment, the vehicle seat assembly has the fixed bracket mount, with the fixed bracket mount extending from a vehicle frame.

According to another further embodiment, a support stud is positioned within the seat back bracket and extending along the transverse axis such that the seat back rotates about the support stud when moving from the first position to the second position. The support stud is for fixed connection to the bracket mount. The support stud is connected to the first end region of the torsion spring.

According to an even further embodiment, the support stud defines an aperture therethrough. The first end region of the torsion spring extends substantially perpendicular to the transverse axis and through the aperture.

According to another even further embodiment, a bushing is positioned between the support stud and the seat back bracket.

According to a further embodiment, the seat back has an upper end region and a lower end region opposite to the upper end region, with the first side of the seat back facing a forward vehicle direction. The vehicle seat assembly has a seat back release mechanism supported by the upper end region. The torsion spring is supported by the lower end region.

According to another further embodiment, the support bracket comprises first and second side plates spaced apart from one another, with each of the first and second side plates having a flange for connection to the seat back. The first and second side plates are connected by a center plate. The first and second side plates define first and second apertures therethrough, respectively. The first and second apertures are sized to receive the intermediate region of the torsion spring. The first and second side plates define first and second faces, respectively, with each of the first and second faces positioned to seat the block.

According to an even further embodiment, the block includes a contact member having first and second outer legs and first and second inner legs extending therefrom. The first and second inner legs are positioned between the first and second outer legs. The contact member is sized to extend over the faces of the first and second side plates. The first inner leg and first outer leg cooperate to receive the first side plate therebetween. The second inner leg and second outer leg cooperate to receive the second side plate therebetween. The first and second side plates bias the first and second inner legs towards one another to retain the block relative to the support bracket.

According to another even further embodiment, the first and second side plates of the support bracket define third and fourth apertures, respectively, with each of the third and fourth apertures positioned between a face and a flange of the associated side plate. The block includes a contact member having first and second outer legs and at least one inner leg extending therefrom. The at least one inner leg is positioned between the first and second outer legs. Each of the outer legs forms a projection, with the projections of the first and second outer legs extending towards one another. The contact member is sized to extend over the faces of the first and second side plates. The at least one inner leg is sized to be received between the first and second side plates. The first and second outer legs are sized to receive the first and side plates therebetween. The projection of the first outer leg is received by the third aperture of the first side plate and the projection of the second outer leg is received by the fourth aperture of the second side plate to retain the block relative to the support bracket.

According to another embodiment, a biasing mechanism for a vehicle seat assembly is provided. A support stud is sized to be received within a seat back bracket and extend along an axis of rotation of a seat back. The support stud has a first end for fixed connection relative to a vehicle frame. The support stud has a second end opposite to the first end and defining an aperture therethrough. A biasing member has a first end region, a second opposed end region, and an intermediate region positioned therebetween. The first end region extends through the aperture in the support stud and is fixed relative thereto. A support bracket to connect to the seat back is provided, with the intermediate region of the biasing member extending through the support bracket and supported for rotation therein. A block is supported by the support bracket and offset from the axis of rotation. The block contacts the second end region of the biasing member to bias the biasing member as the seat back rotates through a first range of motion. The block is spaced apart from the second end region of the biasing member such that the biasing member is unloaded as the seat back rotates through a second range of motion.

According to a further embodiment, the second end region of the biasing member extends along an axis substantially parallel to and offset from the axis of rotation.

According to another further embodiment, the block is a first block. The biasing mechanism includes a series of blocks, with one of the series of blocks being the first block. Each block in the series of blocks has a different thickness to provide a range of preload for the biasing member with a seat back in a seating position.

According to an embodiment, a method of installing a vehicle seat assembly is provided. A seat back is rotatably connected relative to a seat base via a seat back bracket and a fixed bracket mount such that the seat back rotates about a transverse axis from a first, use position to a second, folded position relative to a seat base. A support stud is positioned into the seat back bracket and connecting the support stud to the fixed bracket mount such that the seat back bracket and seat back rotates relative to the support stud. A first end region of a biasing member is connected to the support stud such that the first end region is fixed relative thereto. An intermediate region of the biasing member is positioned through an aperture in a support bracket connected to the seat back such that the intermediate region of the biasing member is supported for rotation therein. A block having a thickness is connected to the support bracket with the block offset from the transverse axis. The biasing member is biased by positioning a second end region of the biasing member in contact with the block with the seat back in the first position such that the thickness of the block biases the biasing member to a specified preload. In response to a seat back release mechanism being released, the seat back is rotated through a first range of motion via the biasing member and the seat back is rotated through a second range of motion via an inertia of the seat back. The block contacts the second end region of the biasing member through the first range of motion, with the first range of motion including the first position. The block is spaced apart from the second end region of the biasing member such that the spring is unloaded through the second range of motion, with the second range of motion including the second position.

According to a further embodiment, the block is selected from a series of blocks, with each block in the series of blocks having a different thickness associated with a different specified preload. The block is selected based on a trim package selected for the vehicle and/or a gauge performed on the vehicle seat assembly at an end-of-line test.

DETAILED DESCRIPTION

As required, detailed embodiments of the present invention are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
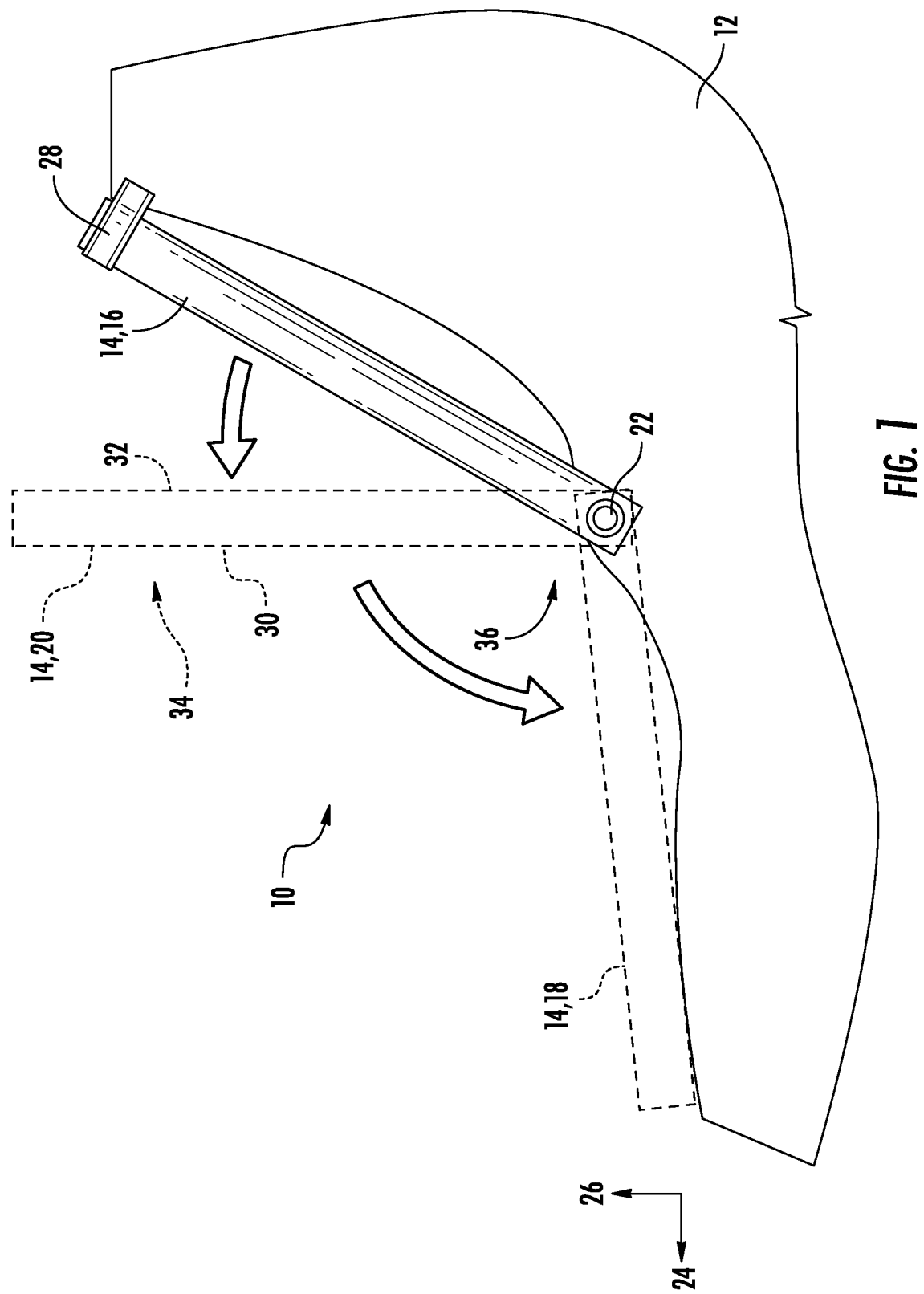
FIG. 1 illustrates a schematic view of a vehicle seat assembly and a portion of a vehicle according to an embodiment.

FIG. 1 illustrates a schematic view of a vehicle seat assembly 10 and a portion of a vehicle 12, such as a vehicle frame. In one example, the vehicle seat assembly 10 is provided as a rear vehicle seat assembly, for example, as a second or third row seat.

The vehicle seat assembly 10 has a seat back 14 that is rotatably connected to the vehicle frame 12. The vehicle frame 12 may form a pass through or opening behind the seat back for access to a trunk from a vehicle occupant area of the vehicle. A seat base or cushion may be provided on the vehicle frame 12.

The seat back 14 is shown in a first, use position 16 in FIG. 1. The seat back 14 may be rotated or folded forward to a second, folded position 18. The vehicle seat back 14 may also have a third position 20 between the first and second positions 16, 18 that the vehicle seat 10 moves through while it is being folded or unfolded.

The seat back 14 rotates about a transverse axis 22 of the vehicle and of the vehicle seat assembly. The longitudinal axis 24, and the vertical axis 26 are also shown in FIG. 1. The axes 22, 24, 26 may be orthogonal to one another. In one example, the seat back 14 extends substantially along the vertical axis 26 with the seat back in the third position 20. As used herein, substantially includes angles within ten degrees or within five degrees of the stated angle or orientation.

The seat back 14 has a seat back release mechanism 28 to retain the seat back to the vehicle frame 12 in in the use position 20. The seat back release mechanism may be provided by an upper latch mechanism 28. Upon releasing the upper latch mechanism 28, the seat back 14 is free to fold or rotate forward towards the third and second positions 20, 18. Typically to re-engage the upper latch mechanism 28, the seat back 14 is pushed towards the first position 16, and towards the frame 12, and the latch engages without actuation from the user.

The seat back 14 has a first side 30 and a second side 32 that is opposite to the first side. The first side 30 faces the vehicle cabin, or faces a forward vehicle direction when the seat back 14 is in the first position 16. The second side therefore faces a rearward vehicle direction, or a rear luggage compartment, when the seat back 14 is in the first position 16. The seat back 14 also has an upper end region 34 and a lower end region 36 opposite to the upper end region. The seat back release mechanism is supported by the upper end region 34 of the seat back.

Figure 2:
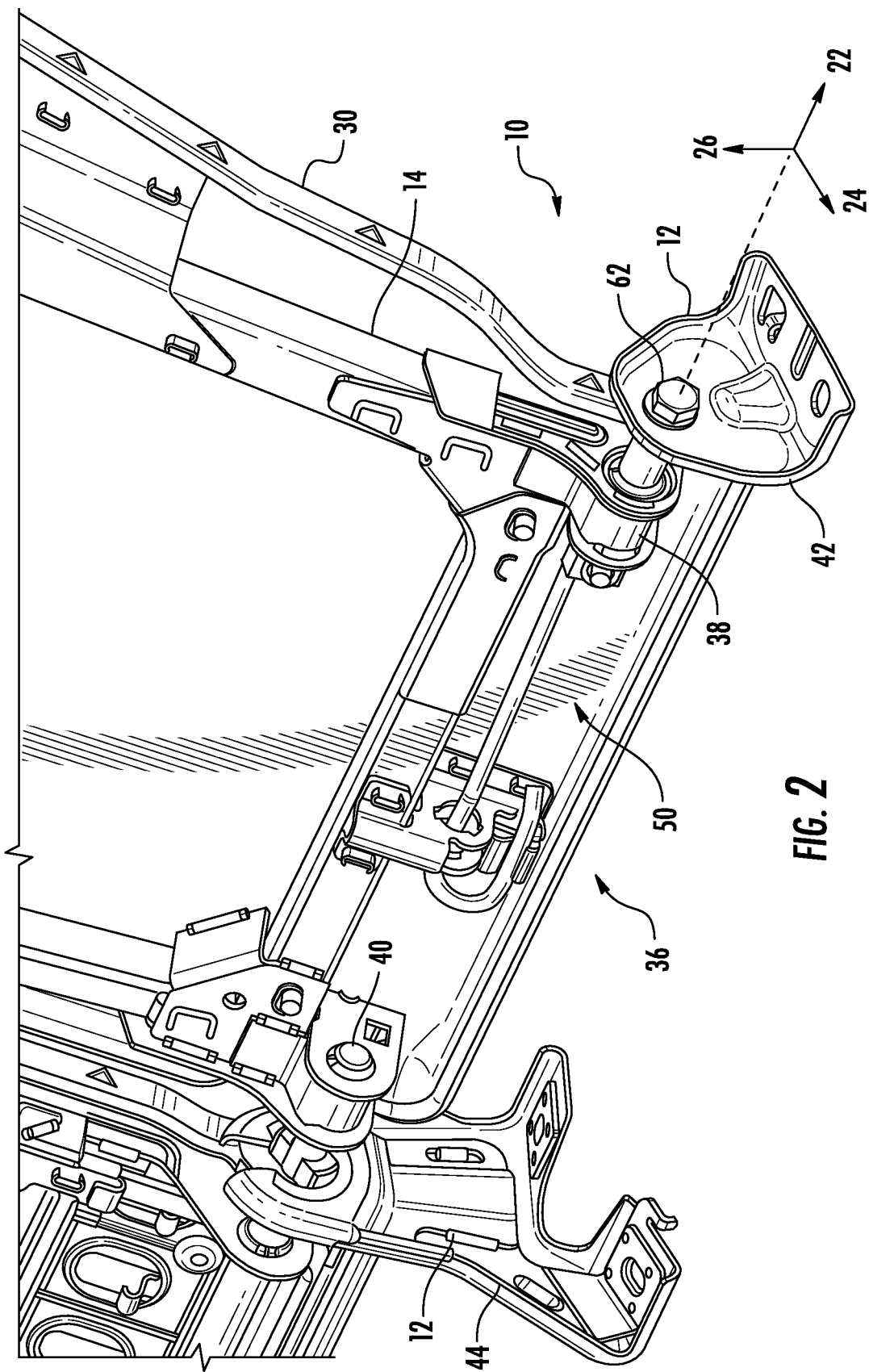
FIG. 2 illustrates a partial perspective view of the vehicle seat assembly and a biasing mechanism according to an embodiment.
Figure 3:
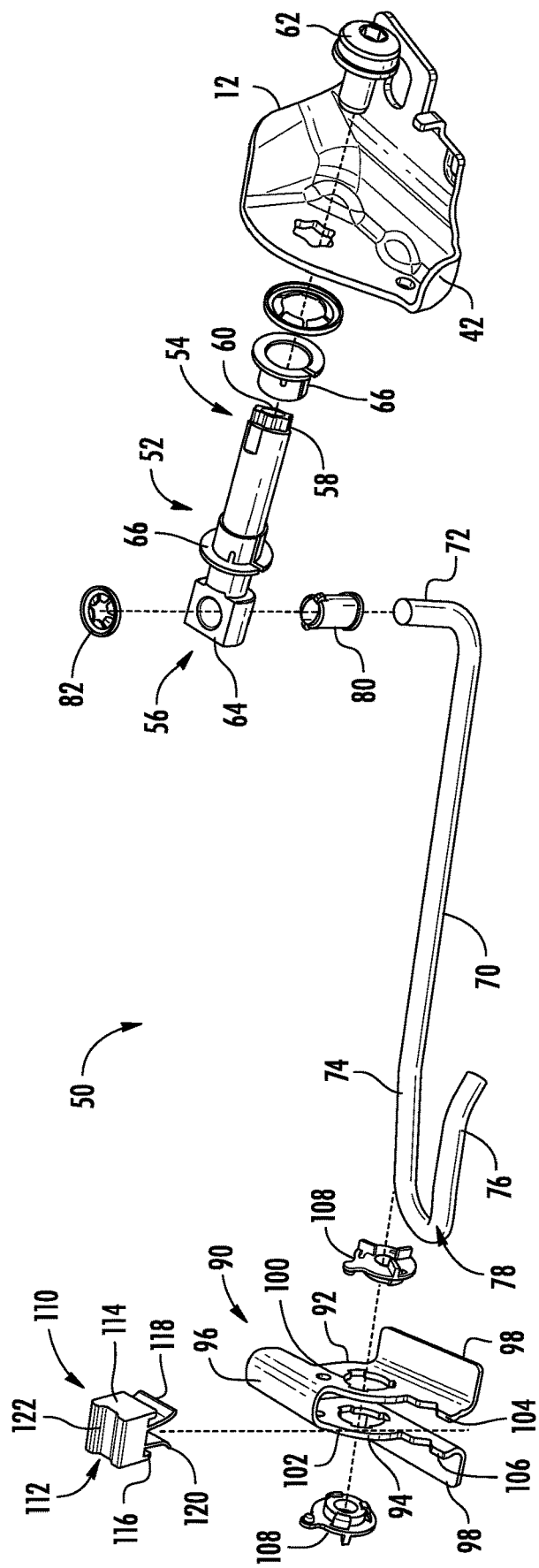
FIG. 3 illustrates an exploded view of the biasing mechanism of FIG. 2.

In order to bias the seat back 14 from the first position 16 towards the second position 18 when the seat back release mechanism is actuated, a biasing mechanism 50 may be provided. An example of a biasing mechanism 50 according to the present disclosure is shown in FIGS. 2-3. The biasing mechanism 50 may be provided at the lower end region 36 of the seat back, and may be provided on the first side 30 of the seat back such that it is later covered by cushion and trim materials for a left-hand vehicle seat, a right-hand vehicle seat, and/or a middle backrest region of a vehicle seating assembly.

The biasing mechanism 50 according to the present disclosure allows for an adjustable force to be provided by the biasing mechanism 50 to the seat back 14. The biasing mechanism 50 may be the sole biasing mechanism providing an ejection force for the seat back 14. The force applied by the biasing mechanism 50 to the seat back 14 may need to be varied and preselected, for example, during assembly, based on different trim selections for the vehicle and vehicle seat assembly, and the like. For example, when the vehicle is offered with multiple trim packages, or there is variation in tolerances during the assembly process, friction between the seat back 14 and the surrounding vehicle trim may prevent the seat back from folding forward. The biasing mechanism 50 according to the present disclosure allows for an adjustment of the force provided by the biasing mechanism to provide an ejection force to the seat back that is within a specified range or to meet a specified criteria. In one example, the biasing mechanism 50 is preloaded such that the ejection force applied by the biasing mechanism to the seat back 14 when the upper latch mechanism 28 is released causes the seat back to rotate from the first position 16 to the third position 20 without any additional input or force applied by the user. When the seat back 14 reaches the third position 20, the seat back is moving, and the inertia and momentum of the seat back causes it to continue to move forward from the third position 20 to the second position 18 without any additional input or force applied by the user. Therefore, in order to release the seat back 14 from the first, use position to the second, folded position, the user only is required to release the upper latch mechanism 28, for example, by using a latch release handle or tab.

Referring to FIGS. 2-3, the seat back 14 has seat back brackets 38, 40 that rotatably connect the seat back to fixed bracket mounts 42, 44 on the vehicle frame 12, such that the seat back 14 rotates about an axis of rotation 22 or the transverse axis 22. As used herein, fixed refers to a component that is securely mounted or fastened and is constrained against movement. So, the fixed bracket mounts 42, 44 are secured and constrained against movement relative to the vehicle frame 12. The vehicle seat and the associated seat back brackets 38, 40 therefore move relative to the fixed bracket mounts 42, 44 when the seat back is moved from the first position 16 to the second position 18. The fixed bracket mounts 42, 44 may be connected to the vehicle frame 12, for example using fasteners or via a process such as welding. In other examples, the fixed vehicle mounts 42, 44 may be integrally formed with the vehicle frame 12.

The biasing mechanism 50 has a support stud 52. The support stud extends from a first end 54 to a second end 56. The support stud 52 cooperates with the seat back bracket 38 and the fixed bracket mount 42. In one example, the support stud 52 extends through the seat back bracket 38 and provides the hinge pin about which the seat back 14 rotates. As shown in FIGS. 2-3, the seat back bracket 38 receives the support stud 52 therein. The support stud 52 extends along the axis of rotation 22 of the seat back 14, or along the transverse axis 22 of the vehicle seat assembly. The seat back 14 therefore rotates about the support stud 52 when moving from the first position 16 to the second position 18.

The first end 54 of the support stud 52 is fixed and connected to the fixed bracket mount 42 and the vehicle frame 12. The first end 54 of the stud may define a form fit shape 58, such as a square or other polygonal shape, or other more complex shapes such as a star shape. The bracket mount 42 defines a corresponding form fit shape to mate with the first end 54 of the support stud 52 and fix the support stud 52 to the bracket mount. The first end 54 may additionally define a threaded aperture 60 sized to receive a fastener 62 such as a bolt to connect the support stud 52 to the bracket mount 42. In another example and in addition to a fastener or as an alternative method to connecting the support stud to the bracket mount, the first end 54 of the stud may be press fit or interference fit into the bracket mount 42.

The second end 56 of the support stud 52 defines an aperture 64 therethrough. The aperture 64 may extend substantially transversely or perpendicularly to the axis of rotation 22.

One or more bushings 66, such as a pair of sleeve bushings may be provided between the support stud 52 and the vehicle seat bracket to reduce friction between the seat back bracket 38 and the support stud 52 as the seat back 14 rotates. The bushings 66 may be formed from a low friction material such as a plastic. A spring washer may be used to locate the bushings 66 relative to the support stud 52.

The biasing mechanism 50 has a biasing member 70 such as a torsion spring 70 or torsion bar spring 70. For a torsion spring 70, an end of the spring rotates through a torsion angle as a load is applied, and the load applied may be a torque or twisting force that creates shear stresses in the torsion spring. The torsion spring 70 has a first end region 72, a second opposed end region 74, and an intermediate region 74 positioned therebetween. The torsion spring 70 extends from being adjacent to the seat back bracket 38 to partially across the seat back 14, and may be spaced apart from the other seat back bracket 40 as shown.

The first end region 72 is adjacent to the seat back bracket 38 and is fixedly connected to the vehicle frame 12 or to the bracket mount 42 such that the seat back 14 rotates relative to the first end region 72 of the torsion spring 70 about the transverse axis 22. The first end region 72 of the torsion spring is connected to the second end of the support stud 52. In the example shown, the first end region 72 of the torsion spring extends transversely to the axis of rotation 22 or the transverse axis 22 and extends through the aperture in the support stud 52. Fasteners, such as a stud bushing 80 and a spring washer 82 may be used to locate and connect the first end region 72 of the torsion spring into the aperture of the support stud 52. The first end region 72 of the torsion spring is therefore fixed and connected to the support stud 52, and likewise to the bracket mount 42 and vehicle frame 12.

The second end region 76 of the torsion spring is offset from the transverse axis 22. In the example shown, the second end region 76 of the torsion bar spring extends along an axis substantially parallel to and offset from the axis of rotation 22. Furthermore, the torsion angle of the second end region may vary as the torsion bar spring is loaded relative to the angle of the unloaded torsion bar spring. For example, as the torsion bar spring is loaded, the second end region 76 rotates about the axis of rotation 22 with a varying torsion angle. The second end region 76 may have a torsion angle of zero with the torsion bar spring in an unloaded state, and the torsion angle may increase as the seat back is rotated towards the first position and the second end region is rotated about the axis of rotation 22. For example, the second end region may be rotated about the axis of rotation 22 from the unloaded state to a loaded state in the first use position through a torsion angle of ten degrees, twenty degrees, thirty degrees, forty or more degrees, or another value. In one example, the torsion bar spring is overbent in the unloaded position such that the second end region of the torsion bar lies flat along the block to reduce stress and wear.

The intermediate region 74 of the torsion spring extends substantially parallel to the axis of rotation 22 or along the transverse axis 22, and is offset from the second end region 76.

In the example shown, the spring 70 has a curved section 78 between the intermediate region 74 and the second end region 76. The curve 78 may be provided as a U-shape such that the intermediate region 74 and the second end region 76 are substantially parallel to one another. In another example, the curve 78 in the torsion spring 70 may be curved or shaped, e.g. with an S-curve, such that the second end region 76 is spaced apart from the intermediate region 74 in the transverse direction.

The biasing mechanism 50 has a support bracket 90 connected to the first side 30 of the seat back 14. The support bracket 90 may be connected to the seat back 14 using fasteners, or via another process such as welding.

The intermediate region 74 of the torsion spring extends through the support bracket 90 and is supported for rotation by the support bracket 90. Note that the intermediate region 74 and second end region 76 of the torsion spring do not rotate through the same angular range as the seat back 14.

In one example, and as shown in FIG. 3, the support bracket 90 is formed by first and second side plates 92, 94 that are spaced apart from one another along the transverse axis 22 and interconnected by a center plate 96. Each of the first and second side plates 92, 94 have a flange 98 for connection to the seat back 14. The center plate 96 is positioned to be spaced apart from the flanges 98. The first and second side plates 92, 94 define first and second apertures 100, 102 therethrough, respectively. The first and second apertures 100, 102 are sized to receive the intermediate region 74 of the torsion spring. In one example, the support bracket 90 may be formed from a single sheet of material, for example, via a stamping process or the like. The support bracket may be provided with mirror symmetry such that it may be used on either a left-hand or right-hand vehicle seat assembly. The first and second side plates 92, 94 define first and second faces 104, 106, respectively. The first and second faces 104, 106 are positioned to seat a block 110 as described below, and may be provided by edge surfaces of the first and second side plates 92, 94.

A pair of spring bushings 108 may be provided and inserted into the apertures 100, 102 to support the torsion spring 70 for rotation relative to the support bracket 90, and also to stabilize the torsion spring 70 and reduce movement such as wobble. In another example, only one bushing 108 may be used with the support bracket 90.

The biasing mechanism 50 has a block 110 supported by the support bracket 90 and offset from the transverse axis 22. The block 110 is positioned to contact the second end region 76 of the torsion spring when the seat back 14 is in the first position 16 to bias and preload the spring 70. The block 110 is seated onto the first and second faces 104, 106 of the support bracket 90.

In one example, and as shown in FIG. 3, the block 110 has a contact member 112 with first and second outer legs 114, 116 and first and second inner legs 118, 120 extending therefrom. The block 110 may be integrally formed, and may be formed from material to reduce noise, vibration, and harshness, such as a plastic or an elastomer material. The contact member 112 is sized to extend over the faces 104, 106 of the first and second side plates. The outer surface 122 of the cushion member may be contoured, e.g. with a concave shape, to cooperate with and receive the second end region 76 of the torsion spring.

The opposite side of the contact member 112 may be provided with a form fit shape to cooperate with a corresponding form fit shape on the faces 104, 106 of the side plates 92, 94 of the support bracket. In the example shown, the faces 104, 106 define a pair of angular recesses, and the block 110 defines a corresponding pair of angular projections that mate with the angular recesses to prevent the block 110 from sliding on the faces and relative to the bracket 90.

The first and second inner legs 118, 120 of the block 110 are positioned between the first and second outer legs 114, 116. The first inner leg 118 and first outer leg 114 form a recess therebetween and cooperate to receive the first side plate 92. The second inner leg 120 and second outer leg 116 form a recess therebetween and cooperate to receive the second side plate 94.

The first and second inner legs 118, 120 may be shaped such that they are transversely spaced apart from one another by a distance that is greater than a distance between the first and second side plates 92, 94 of the support bracket before the block 110 is installed. Therefore, the first and second inner legs 118, 120 are biased towards one another to install the block 110. Additionally, the first and second side plates 92, 94 bias the first and second inner legs 118, 120 towards one another to retain the block 110 relative to the support bracket 90 such that the first and second inner legs 118, 120 function similarly to a spring clip. In a further example, and as shown, the distance between the first and second legs 118, 120 increases in a direction away from the contact member 112.

Figure 6:
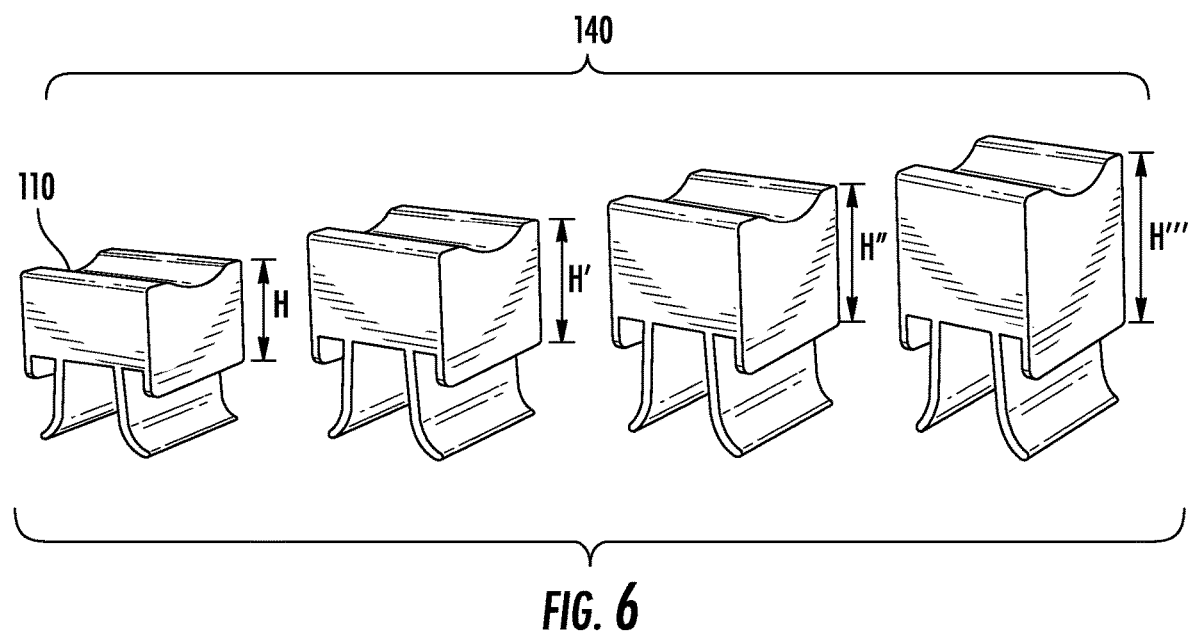
FIG. 6 illustrates a series of blocks for use with the biasing mechanism of FIG. 3 according to an embodiment.

The block 110 has an associated height H or thickness as shown in FIG. 6. The height H of the block 110 changes the amount of preload on the torsion spring 70. The second end region 76 of the torsion spring 70 contacts the block 110 to bias the torsion spring 70 as the seat back 14 rotates through a first range of motion, for example, while the seat back 14 moves between the first and third positions 16, 20. The torsion spring 70 exerts the highest force on the seat back 14 when the seat back is in the first position 16, and the force exerted by the torsion spring 70 on the seat back 14 decreases as the seat back rotates from the first position 16 towards the third position 20.

The second end region 76 of the spring is spaced apart from the block 110 such that the torsion spring 70 is unloaded or in a free state as the seat back 14 rotates through a second range of motion, for example, while the seat back moves between the third and second positions 20, 18. The torsion spring 70 is therefore not exerting any force on the seat back 14 as the seat back moves between the third and second positions 20, 18. As the seat back 14 rotates from the third position 20 towards the second position 18, the angular distance between the second end region 76 of the spring and the block 110 increases. By having the block 110 spaced apart from the torsion spring 70 through the second range of motion, the force required from a user to move the seat back 14 from the second position 18 to the third position 20, e.g. when returning the seat back to the first position 16, is reduced and therefore easier for the user.

During operation, the second end region 76 of the torsion spring 70 exerts a rearward force on the lower end region 36 of the seat back 14 at a location below the axis of rotation 22. This causes the seat back portion above the axis of rotation 22, e.g. the upper end region 34, to rotate forwardly and move towards a folded position.

In another example, and as contemplated herein the biasing mechanism 50 may be positioned on the second side 32 of the seat back 14, and with the second end region 76 of the torsion spring 70 positioned above the axis of rotation 22 to exert a forward force on the seat back 14, such that the lower end region 36 of the seat back rotates rearwardly and the seat back moves towards the folded position.

Figure 4:
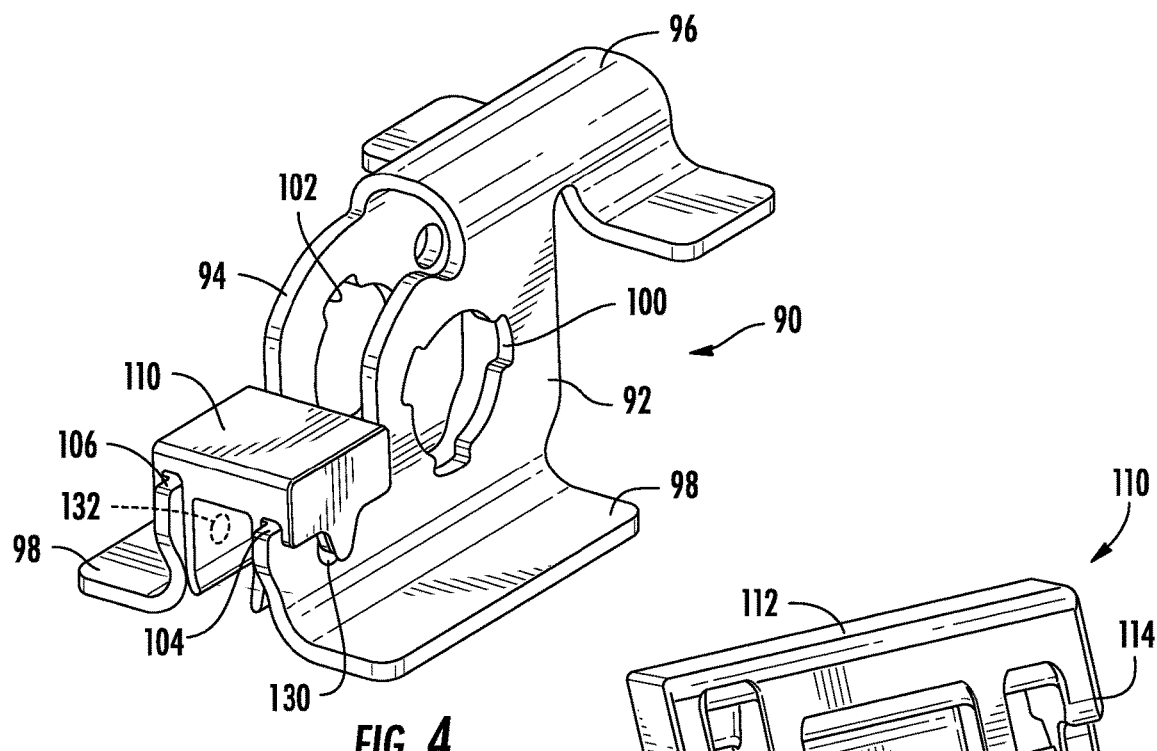
FIG. 4 illustrates a perspective view of a support bracket and a block for use with the biasing mechanism of FIG. 3 according to another embodiment.
Figure 5:
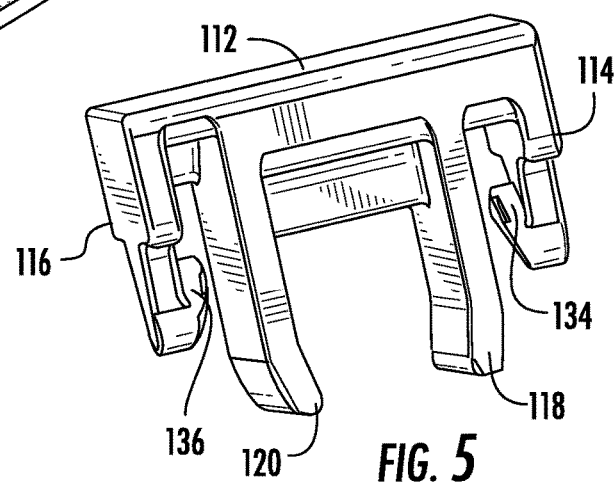
FIG. 5 illustrates a perspective view of the block of FIG. 4.

FIG. 4-5 illustrate another example of a support bracket 90 and block 110 for use with the biasing mechanism 50 of FIGS. 1-3. Elements that are the same as or similar to those described above with respect to FIGS. 1-3 are given the same reference number for simplicity.

The first and second side plates 92, 94 of the support bracket further define third and fourth apertures 130, 132, respectively. Note that the fourth aperture 132 is shown in broken lines in FIG. 4. The third and fourth apertures 130, 132 may each extend through the associated side plate 92, 94. Each of the third and fourth apertures 130, 132 are positioned between and spaced apart from a face 104, 106 and a flange 98 of the associated side plate 92, 94.

The block 110 has at least one inner leg 118, 120 that is sized to be received between the first and second side plates 92, 94, and in the example shown, is provided with a pair of inner legs 118, 120.

The block 110 also has first and second outer legs 114, 116 sized to receive the first and side plates 92, 94 therebetween. Each of the first and second outer legs 114, 116 forms or defines a projection 134, 136. The projections 134, 136 of the first and second outer legs 114, 116 extend towards one another.

The projection 134 of the first outer leg 114 is received by the third aperture 130 of the first side plate 92 and the projection 136 of the second outer leg 116 is received by the fourth aperture 132 of the second side plate 94 to retain the block 110 relative to the support bracket 90.

In an alternative example, the inner leg(s) 118, 120 may be provided with a projection extending outwardly towards the associated outer leg 114, 116, and the outer leg may be without a projection.

Furthermore, the block 110 may be connected to the support bracket 90 using a fastener such as a push in clip fastener, or the like.

Referring to FIG. 6, a series of blocks 140 may be provided for use with the biasing mechanism 50. The block 110 as described above with respect to FIGS. 2-5 may be one of the blocks in the series of blocks 140. The series of blocks 140 may include two blocks, three blocks, four blocks, or more. Each block has a different thickness to provide a range of loadings or preload for the torsion spring 70 with a seat back 14 in the first, use position.

The vehicle seat assembly 10 may be installed by rotatably connecting the seat back 14 relative to a seat base via a seat back bracket 38 and a fixed bracket mount 42 such that the seat back rotates about a transverse axis 22 from a first, use position to a second, folded position relative to a seat base. The seat back 14 may be connected to the fixed bracket mount 42 on a vehicle frame 12 for rotation.

A support stud 52 is positioned into the seat back bracket 38 and is connected to the fixed bracket mount such that the seat back bracket 38 and seat back 14 rotates relative to the support stud 52.

A first end region 72 of a torsion spring 70 is connected to the support stud 52 such that the first end region 72 is fixed relative thereto. An intermediate region 74 of the spring is positioned through an aperture in a support bracket 90 that is connected to the seat back 14 such that the intermediate region 74 of the spring is supported for rotation therein.

A block 110 is connected to the support bracket 90, with the block 110 offset from the transverse axis 22. The block 110 has a thickness. The block 110 may be selected from a series of blocks 140, with each block in the series of blocks 140 having a different thickness associated with a different specified preload. The block 110 may be selected based on a trim package selected for the vehicle and/or a gauge performed on the vehicle seat assembly at an end-of-line test.

The torsion spring 70 is biased by positioning a second end region 76 of the spring in contact with the block 110 with the seat back 14 in the first position 16 such that the thickness of the block 110 biases the torsion spring 70 to a specified preload.

In response to a seat back release mechanism being released, the seat back 14 is rotated through a first range of motion via the torsion spring 70 and the seat back 14 is rotated through a second range of motion via an inertia of the seat back. The block 110 contacts the second end region 76 of the spring through the first range of motion, with the first range of motion including the first position 16. The block 110 is spaced apart from the second end region 76 of the torsion spring 70 such that the torsion spring 70 is unloaded through the second range of motion, with the second range of motion including the second position 18.

While exemplary embodiments are described above, it is not intended that these embodiments describe all possible forms of the invention. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle seat assembly comprising:
   a seat back with a seat back bracket for connection to a fixed bracket mount, the seat back bracket and fixed bracket mount cooperating to support the seat back for rotational movement about a transverse axis from a first, use position to a second, folded position relative to a seat base;
   a torsion spring with a first end region, a second opposed end region, and an intermediate region positioned therebetween, the first end region adjacent to the seat back bracket and for fixed connection to the fixed bracket mount such that the seat back rotates relative to the first end region of the spring about the transverse axis, the second end region offset from the transverse axis;

a support bracket connected to the seat back, the intermediate region of the torsion spring supported for rotation by the support bracket; and a block supported by the support bracket and offset from the transverse axis, the block contacting the second end region of the torsion spring to bias the spring when the seat back is in the first position.

2. The vehicle seat assembly of claim 1 wherein the block is spaced apart from the second end region of the torsion spring with the torsion spring unloaded when the seat back is in the second position.

3. The vehicle seat assembly of claim 1 wherein the seat back has a third position between the first and second positions;

wherein the block is in contact with the second end region of the torsion spring to bias the spring while the seat back moves between the first and third positions; and wherein the block is spaced apart from the second end region of the torsion spring such that the spring is unloaded while the seat back moves between the third and second positions.

4. The vehicle seat assembly of claim 3 wherein a distance between the block and the second end region of the torsion spring increases as the seat back moves from the third position to the second position.

5. The vehicle seat assembly of claim 3 wherein the seat back is substantially vertical in the third position.

6. The vehicle seat assembly of claim 1 wherein the block is a first block; and wherein the vehicle seat assembly further comprises a series of blocks, one of the series of blocks being the first block, each block in the series of blocks having a different thickness to provide a range of loadings of the torsion spring with the seat back in the first position.

7. The vehicle seat assembly of claim 1 wherein the torsion spring has a curved section between the intermediate region and the second end region such that the intermediate region and the second end region are substantially parallel to one another.

8. The vehicle seat assembly of claim 1 further comprising the fixed bracket mount, wherein the fixed bracket mount extends from a vehicle frame.

9. The vehicle seat assembly of claim 1 further comprising a support stud positioned within the seat back bracket and extending along the transverse axis such that the seat back rotates about the support stud when moving from the first position to the second position, the support stud for fixed connection to the fixed bracket mount; and wherein the support stud is connected to the first end region of the torsion spring.

10. The vehicle seat assembly of claim 9 wherein the support stud defines an aperture therethrough; and wherein the first end region of the torsion spring extends substantially perpendicular to the transverse axis and through the aperture.

11. The vehicle seat assembly of claim 9 further comprising a bushing positioned between the support stud and the seat back bracket.

12. The vehicle seat assembly of claim 1 wherein the seat back has an upper end region and a lower end region opposite to the upper end region;

wherein the vehicle seat assembly further comprises a seat back release mechanism supported by the upper end region; and wherein the torsion spring is supported by the lower end region.

13. The vehicle seat assembly of claim 1 wherein the support bracket comprises first and second side plates spaced apart from one another, each of the first and second side plates having a flange for connection to the seat back, the first and second side plates connected by a center plate, wherein the first and second side plates define first and second apertures therethrough, respectively, wherein the first and second apertures are sized to receive the intermediate region of the torsion spring, and wherein the first and second side plates define first and second faces, respectively, each of the first and second faces positioned to seat the block.

14. The vehicle seat assembly of claim 13 wherein the block comprises a contact member having first and second outer legs and first and second inner legs extending therefrom, the first and second inner legs positioned between the first and second outer legs, the contact member sized to extend over the faces of the first and second side plates, wherein the first inner leg and first outer leg cooperate to receive the first side plate therebetween, and the second inner leg and second outer leg cooperate to receive the second side plate therebetween, wherein the first and second side plates bias the first and second inner legs towards one another to retain the block relative to the support bracket.

15. The vehicle seat assembly of claim 13 wherein the first and second side plates define third and fourth apertures, respectively, each of the third and fourth apertures positioned between a face and a flange of the associated side plate; and wherein the block comprises a contact member having first and second outer legs and at least one inner leg extending therefrom, the at least one inner leg positioned between the first and second outer legs, each of the outer legs forming a projection, the projections of the first and second outer legs extending towards one another, the contact member sized to extend over the faces of the first and second side plates, the at least one inner leg sized to be received between the first and second side plates, and the first and second outer legs sized to receive the first and second side plates therebetween, wherein the projection of the first outer leg is received by the third aperture of the first side plate and the projection of the second outer leg is received by the fourth aperture of the second side plate to retain the block relative to the support bracket.

16. A biasing mechanism for a vehicle seat assembly comprising:

a support stud sized to be received within a seat back bracket and extend along an axis of rotation of a seat back, the support stud having a first end for fixed connection relative to a vehicle frame, the support stud having a second end opposite to the first end and defining an aperture therethrough;

a biasing member with a first end region, a second opposed end region, and an intermediate region positioned therebetween, the first end region extending through the aperture in the support stud and fixed relative thereto;

a support bracket to connect to the seat back, the intermediate region of the biasing member extending through the support bracket and supported for rotation therein; and a block supported by the support bracket and offset from the axis of rotation, the block contacting the second end region of the biasing member to bias the biasing member as the seat back rotates through a first range of motion, the block spaced apart from the second end region of the biasing member such that the biasing member is unloaded as the seat back rotates through a second range of motion.

17. The biasing mechanism of claim 16 wherein the second end region of the biasing member extends along an axis substantially parallel to and offset from the axis of rotation.

18. The biasing mechanism of claim 16 wherein the block is a first block; and
wherein the biasing mechanism further comprises a series of blocks, one of the series of blocks being the first block, each block in the series of blocks having a different thickness to provide a range of preload for the biasing member with a seat back in a seating position;
wherein only the first block is installed into the associated biasing mechanism.

19. A method of installing a vehicle seat assembly, the method comprising:
rotatably connecting a seat back relative to a seat base via a seat back bracket and a fixed bracket mount such that the seat back rotates about a transverse axis from a first, use position to a second, folded position relative to a seat base;
positioning a support stud into the seat back bracket;
connecting the support stud to the fixed bracket mount such that the seat back bracket and seat back rotate relative to the support stud;
connecting a first end region of a biasing member to the support stud such that the first end region is fixed relative thereto;
positioning an intermediate region of the biasing member through an aperture in a support bracket connected to the seat back such that the intermediate region of the biasing member is supported for rotation therein;
connecting a block having a thickness to the support bracket with the block offset from the transverse axis;
biasing the biasing member by positioning a second end region of the biasing member in contact with the block with the seat back in the first position such that the thickness of the block biases the biasing member to a specified preload; and
in response to a seat back release mechanism being released, rotating the seat back through a first range of motion via the biasing member and rotating the seat back through a second range of motion via an inertia of the seat back, the block contacting the second end region of the biasing member through the first range of motion, the first range of motion including the first position, the block spaced apart from the second end region of the biasing member such that the biasing member is unloaded through the second range of motion, the second range of motion including the second position.

20. The method of claim 19 further comprising selecting the block from a series of blocks, each block in the series of blocks having a different thickness associated with a different specified preload, based on a trim package selected for the vehicle and/or a gauge performed on the vehicle seat assembly at an end-of-line test.

* * * * *